United States Patent Office 3,052,721
Patented Sept. 4, 1962

3,052,721
DIHYDRODIBENZOCYCLOHEPTENE
DERIVATIVES
Jack Bernstein and Kathryn A. Losee, New Brunswick, N.J., assignors to Olin Mathieson Chemical Corporation, New York, N.Y., a corporation of Virginia
No Drawing. Filed Jan. 10, 1961, Ser. No. 81,677
13 Claims. (Cl. 260—562)

This invention relates to new basically substituted dihydrodibenzocycloheptenes (and their salts) having valuable therapeutic properties, processes for the preparation thereof, and new intermediates useful in such processes.

The therpaeutically active compounds of this invention include dihydrodibenzocycloheptenes of the general Formula I:

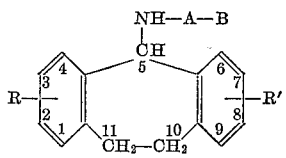

wherein A is a lower alkylene radical of at least two carbon atoms, B is a basic saturated nitrogen-containing radical of less than twelve carbon atoms, and R and R' are the same or different and represent hydrogen, halogen, lower alkyl, lower alkoxy or trifluoromethyl; and salts thereof. Among the suitable radicals represented by the symbol B are: amino; (lower alkyl)amino; di(lower alkyl)amino; (hydroxy-lower alkyl)amino; di(hydroxy-lower alkyl)amino; and basic saturated 5 to 6 membered N-heterocyclic radicals of less than twelve carbon atoms, as exemplified by piperidyl [i.e., piperidino, 2-piperidyl, 3-piperidyl and 4-piperidyl]; (lower alkyl)piperidyl [e.g., 2, 3, or 4-(lower alkyl)piperidino or 2, 3, or 4-(N-lower alkyl)piperidyl]; di(lower alkyl) piperidyl [e.g., 2,4-, 2,5-, or 3,5-di(lower alkyl)-piperidino, or 2, 3, or 4-(N-lower alkyl-2, 3, or 4-(lower alkyl) piperidyl]; (lower alkoxy) piperidyl; pyrrolidyl; (lower alkyl)pyrrolidyl; di(lower alkyl)pyrrolidyl; (lower alkoxy) pyrroidyl; morpholinyl [i.e., morpholino, 2-morpholinyl and 3-morpholinyl]; (lower alkyl)morpholinyl; di(lower alkyl) morpholinyl; (lower alkoxy)morpholinyl; thiamorpholinyl; (lower alkyl)thiamorpholinyl; di(lower alkyl)thiamorpholinyl; (lower alkoxy)thiamorpholinyl; piperazyl; (lower alkyl) piperazyl (e.g., $N^4$-methylpiperazino); di(lower alkyl) piperazyl; (lower alkoxy)piperazyl; (hydroxy-lower alkyl) piperazyl [e.g., $N^4$-(2-hydroxyethyl)piperazino]; (lower alkanoyloxyalkyl)piperazyl [e.g., $N^4$-(2-acetoxyethyl) piperazino]; (hydroxy-lower alkoxy-lower alkyl)piperazyl [e.g., $N^4$-(2-hydroxyethoxyethyl)piperazino]; and (carbo-lower alkoxy)piperazyl [e.g., $N^4$-(2-carbomethoxy, carboethoxy, or carbopropoxy)piperazino]. The terms "lower alkyl," "lower alkoxy," and "lower alkylene," as employed herein, include both straight and branched chain radicals of less than eight carbon atoms. The particularly preferred compounds are those wherein A is a lower alkylene radical of two to three carbon atoms (i.e., ethylene, trimethylene-1,3, and propylene-1,2); B represents a di (lower alkyl)amino radical, an $N^4$-(lower alkyl)-piperazino radical, an $N^4$-(2-hydroxyethyl) piperazino radical, or an $N^4$-(2-acetoxyethyl)piperazino radical, R is in the 3-position and represents hydrogen, chloro or trifluoromethyl, and R' is hydrogen.

As to the salts of the dihydro dibenzocycloheptenes, those coming within the purview of this invention include the acid-addition salts, particularly the non-toxic acid-addition salts. Acids useful for preparing the acid-addition salts include, inter alia, inorganic acids, such as the hydrohalic acids (e.g., hydrochloric and hydrobromic acid), sulfuric acid, nitric acid and phosphoric acid, and organic acids such as oxalic, maleic, tartaric, citric, acetic and succinic acid.

The compounds of this invention are therapeutically active compounds which are utilizable as psychomimetic agents. They may be administered orally or parenterally in conventional dosage forms such as tablets, capsules, injectables or the like by incorporating the appropriate dose of the compound with carriers according to accepted pharmaceutical practice.

The compounds of this invention can be prepared by the process of this invention employing as the starting material a 10,11-dihydro-5H-dibenzo [a,d] cyclohepten-5-one of the general Formula II:

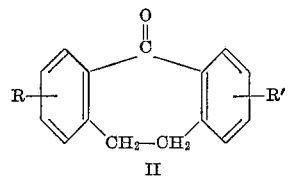

wherein R and R' are as hereinbefore defined. In those instances where the starting keto compound is new, it can be prepared by interacting a phthalic anhydride with a phenylacetic acid to yield a benzalphthalide derivative, which in turn is reacted with phosphorus and hydriodic acid to yield the corresponding dibenzyl-o-carbonic acid. The resulting carbonic acid derivative is then cyclized and condensed by treatment with phosphorus pentoxide at an elevated temperature. This series of reactions is shown by the following equations, where R and R' are as hereinbefore defined:

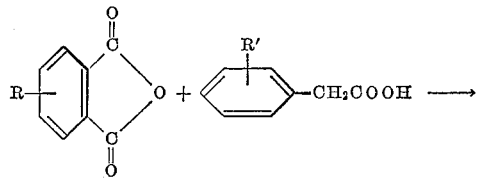

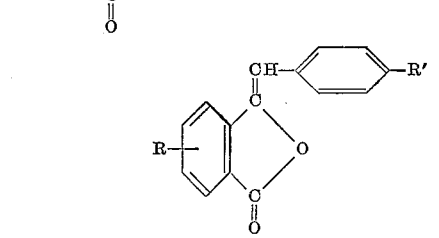

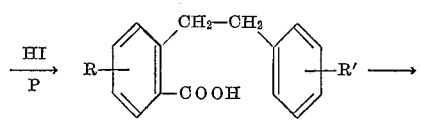

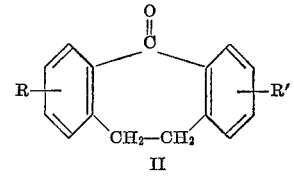

If a substituted phthalic anhydride is used as a reactant in the above series of reactions, the position of the substituent on the resulting benzalphthalide will depend on the position of the substituent on the phthalic anhydride. Thus, where ortho substituted phthalic anhydride is condensed with phenylacetic acid, a mixture of 4- and 7-substituted 3-benzalphthalides is obtained. These products are then separated by fractional crystallization and the separated products treated with phosphorus and hydriodic acid, followed by phosphorus pentoxide, to yield a 1-substituted-10,11-dihydro-5H-dibenzo [a,d] cyclohepten-5-one and a 4-substituted-10,11-dihydro-5H-dibenzo [a,d] cyclohepten-5-one, respectively. Where a meta substituted phthalic anhydride is used, a mixture of 5- and 6-substituted 3-benzalphthalides is obtained. These products are then separated by fractional crystallization and then treated with phosphorus and hydriodic acid, followed by phosphorus pentoxide, to yield a 2-substituted-10,11-dihydro-5H-dibenzo [a,d] cyclohepten-5-one and 3-substituted-10,11-dihydro-5H-dibenzo [a,d] cyclohepten-5-one, respectively.

If a substituted phenylacetic acid is used as a reactant in the above series of reactions, the position of the substituent on the resulting benzalphthalide will depend on the position of the substituent on the phenylacetic acid. Thus, if an ortho substituted phenylacetic acid is condensed with phthalic anhydride and the remaining steps of the process are carried out, a 1-substituted-10,11-dihydro-5H-dibenzo [a,d] cyclohepten-5-one is obtained. If a meta substituted phenylacetic acid is used, a mixture of 2-substituted and 4-substituted 10,11-dihydro-5H-dibenzo [a,d] cyclohepten-5-ones are prepared, which are separated by fractional crystallization. If a para substituted phenylacetic acid is used, a 3-substituted-10,11-dihydro-5H-dibenzo [a,d] cyclohepten-5-one is obtained.

Among the suitable phthalic anhydrides utilizable as initial reagents in these reactions may be mentioned: phthalic anhydride; halo-phthalic anhydrides, such as 3- and 4-chlorophthalic anhydride, 3- and 4-bromophthalic anhydride, and 3- and 4-fluorophthalic anhydride; (lower alkyl) phthalic anhydrides, such as 3- and 4-methylphthalic anhydride, 3- and 4-ethylphthalic anhydride, 3- and 4-isopropylphthalic anhydride, and 3- and 4-n-hexylphthalic anhydride; (lower alkoxy) phthalic anhydrides, such as 3- and 4-methoxyphthalic anhydride, 3- and 4-ethoxyphthalic anhydride, 3- and 4-n-propoxyphthalic anhydride, and 3- and 4-n-hexyloxyphthalic anhydride; and trifluoromethylphthalic anhydrides (i.e., 3-trifluoromethylphthalic anhydride and 4-trifluoromethylphthalic anhydride).

Among the suitable phenylacetic acids utilizable as initial reagents in these reactions may be mentioned: phenylacetic acid; halo-phenylacetic acids, such as o, m, and p-chlorophenylacetic acid, o, m, and p-bromophenylacetic acid, and o, m, and p-fluorophenylacetic acid; (lower alkyl) phenylacetic acids, such as o, m, and p-tolylacetic acid, o, m, and p-ethylphenylacetic acid, o, m, and p-isopropylphenylacetic acid, and o, m, and p-n-hexylphenylacetic acid; (lower alkoxy) phenylacetic acids, such as o, m, and p-anisylphenylacetic acid, o, m, and p-ethoxyphenylacetic acid, o, m, and p-n-propoxyphenylacetic acid, and o, m, and p-n-hexyloxyphenylacetic acid; and o, m, and p-trifluoromethylphenylacetic acid.

To prepare the final compounds of this invention, the ketone is first treated with formic acid and ammonium hydroxide (i.e., ammonium formate) at an elevated temperature to yield the corresponding formamide derivative (compounds III) which is then heated with a base, such as sodium hydroxide, to yield the corresponding amine derivative (compounds IV). The amine is then treated with a halo (lower alkanoyl) halide, preferably a chloro (lower alkanoyl) chloride, such as chloroacetyl chloride and α- or β-chloropropionyl chloride, to yield the corresponding halo (lower alkanoylamide), (compounds V) which in turn is treated with a base of the formula: BH to yield an aminoalkanyl derivative (compounds VI) and then a reducing agent, such as lithium aluminum hydride, to yield the final products of this invention. Alternatively, the last two steps may be reversed and the intermediate can be first reduced and then aminated. These resulting bases can then be treated, if desired, with an acid to yield the acid-addition salts. All compounds formed by the above series of reactions are new compounds of this invention. This series of reactions can be represented by the following equations, wherein R, R', A and B are as hereinbefore defined, and A' is a lower alkylene radical:

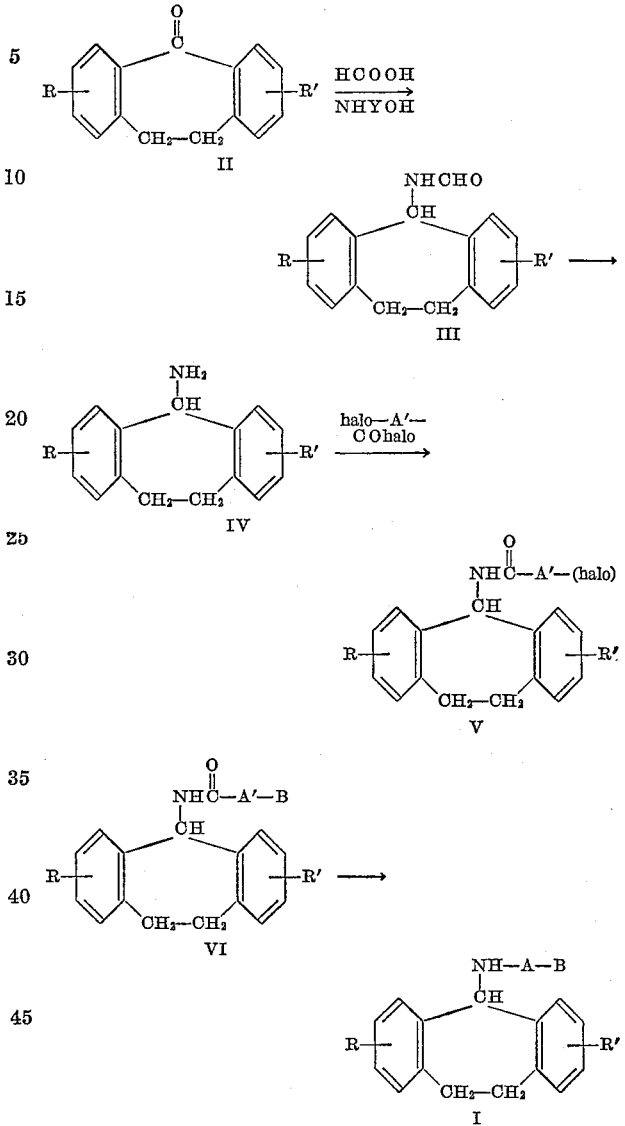

The following examples illustrate the invention (all temperatures being in centigrade). The first six examples are directed to the preparation of the ketone intermediate, and the remaining examples are directed to the preparation of the final compounds of this invention.

EXAMPLE 1

*10,11-Dihydro-5H-Dibenzo [a,d] Cyclohepten-5-One*

A. PREPARATION OF 3-BENZALPHTHALIDE

In a 500 cc. round-bottom flask are placed 100 grams of phthalic anhydride, 110 grams of phenylacetic and 2.6 grams of fused sodium acetate. The reaction mixture is heated rapidly in an oil-bath until the internal temperature reaches 230°. During the next three hours the internal temperature is slowly raised to 240°, during which time the water formed in the reaction is allowed to distill out. The mixture is then cooled to 90° and the product dissolved in 400 ml. of boiling alcohol filtered from a small amount of insoluble material and allowed to cool. The benzalphthalide is filtered and washed with cold alcohol. It is sufficiently pure for use in the next step.

B. PREPARATION OF DIBENZYL-o-CARBONIC ACID

A mixture of 289 g. of benzalphthalide, 113.3 g. of hydrogen iodide (sp. gravity 1.7) and 113.3 g. of red phosphorus is refluxed with stirring for ten hours and the resulting mixture poured into ice water. A red crystalline mass is present which is filtered off and dried. The dried solid is extracted with one liter of boiling acetone and filtered while hot. The acetone filtrate is concentrated to about 300 cc. and cooled. One liter of water is added and the mixture is again cooled. The solid which crystallizes is filtered to yield about 243 g. of product, melting at about 115–118°. Recrystallization from aqueous acetone gives the pure product constant melting at about 121–122°.

C. PREPARATION OF 10,11-DIHYDRO-5H-DIBENZO [a,d] CYCLOHEPTEN-5-ONE

To 260 cc. of 85% phosphoric acid at 80° is added 377 g. of phosphorus pentoxide. The temperature is kept at 80–90° by slowly adding the phosphorus pentoxide. At the end of the addition, the reaction is kept at 100° for one hour, then heated to 170° and 118 g. of dibenzyl-o-carbonic acid is added portionwise. The mixture is reated at 170° for 2½ hours and then poured with stirring into four liters of ice water and allowed to stand overnight. The dark oil is extracted with 3×700 cc. of ether. The ether is washed with sodium bicarbonate and dried over magnesium sulfate. After removal of the ether, the residue is distilled to yield about 81 g. of product, boiling at about 175–180°/3.5 mm. $n_D^{28}$= 1.6315.

EXAMPLE 2

*1- and 4-Chloro-10,11-Dihydro-5H-Dibenzo [a,d] Cyclohepten-5-One*

Following the procedure of Example 1, but substituting an equivalent amount of 3-chlorophthalic anhydride for the phthalic anhydride in step A, there is obtained a mixture of 4-chloro-3-benzalphthalide, which yields 1-chloro-10,11-dihydro-5H-dibenzo [a,d] cyclohepten-5-one, and 7-chloro-3-benzalphthalide, which yields 4-chloro-10,11-5H-dibenzo [a,d] cyclohepten-5-one.

EXAMPLE 3

*2-Chloro-10,11-Dihydro-5H-Dibenzo [a,d] Cyclohepten-1-One*

Following the procedure of Example 1, but substituting an equivalent amount of p-chlorophenylacetic acid for the phenylacetic acid in step A, 2-chloro-10,11-dihydro-5H-dibenzo [a,d] cyclohepten-5-one is obtained.

EXAMPLE 4

*2 and 3-Ethoxy-10,11-Dihydro-5H-Dibenzo [a,d] Cyclohepten-5-One*

Following the procedure of Example 1, but substituting an equivalent amount of 4-ethoxyphthalic anhydride for the phthalic anhydride in step A, there is obtained a mixture of 5-ethoxy-3-benzalphthalide, which yields 2-ethoxy-10,11-dihydro-5H-dibenzo [a,d] cyclohepten-5-one, and 6-ethoxy-3-benzalphthalide, which yields 3-ethoxy-10,11-dihydro-5H-dibenzo [a,d] cyclohepten-5-one.

EXAMPLE 5

*3-Trifluoromethyl-10,11-Dihydro-5H-Dibenzo [a,d] Cyclohepten-5-One*

Following the procedure of Example 1, but substituting an equivalent amount of p-trifluoromethylphenylacetic acid for the phenylacetic acid in step A, 3-trifluoromethyl-10,11-dihydro-5H-dibenzo [a,d] cyclohepten-5-one is obtained.

p-Trifluoromethylphenylacetic acid is prepared by treating the Grignard reagent prepared from p-trifluoromethylbenzyl bromide with carbon dioxide. p-Trifluoromethylbenzyl bromide is prepared by the reduction of p-trifluoromethylbenzoic acid and conversion of the alcohol thus formed to p-trifluoromethylbenzyl bromide by reaction with phosphorus tribromide.

EXAMPLE 6

*7 and 8-Fluoro-1-Methyl-10,11-Dihydro-5H-Dibenzo [a,d] Cyclohepten-5-One*

Following the procedure of Example 1, but substituting an equivalent amount of 4-fluorophthalic anhydride for the phthalic anhydride and an equivalent amount of o-tolylacetic acid for the phenylacetic acid in step A, there is obtained a mixture of 6-fluoro-3-o-methylbenzylidenephthalide, which yields 7-fluoro-1-methyl-10,11-dihydro-5H-dibenzo [a,d] cyclohepten-5-one, and 5-fluoro-3-o-methylbenzylidenephthalide, which yields 8-fluoro-1-methyl-10,11-dihydro-5H-dibenzo [a,d] cyclohepten-5-one.

Similarly, by substituting an equivalent amount of one of the following phthalic anhydrides for the phthalic anhydride in the procedure of step A of Example 1 and carrying out the remaining steps in the example, the indicated substituted 10,11-dihydro-5H-dibenzo [a,d] cyclohepten-5-ones are obtained:

| Substituted Phtahlic Anhydride | Product |
| --- | --- |
| 3-Methyl | 1 and 4-Methyl. |
| 4-Methoxy | 2 and 3-Methoxy. |
| 3-Bromo | 1 and 4-Bromo. |
| 4-Tertiary butyl | 2 and 3-Tertiary butyl. |

Furthermore, by substituting an equivalent amount of one of the following phenylacetic acids for the phenylacetic acid in the procedure of step A of Example 1 and carrying out the remaining steps in the example, the indicated substituted 10,11-dihydro-5H-dibenzo [a,d] cyclohepten-5-one is obtained:

| Substituted Phenylacetic Acid | Product |
| --- | --- |
| O-Methoxy | 1-Methoxy. |
| p-Fluoro | 3-Fluoro. |
| m-Ethyl | 2 and 4-Ethyl. |

EXAMPLE 7

*10,11-Dihydro-5H-Dibenzo [a,d] Cycloheptene-5-Formamide*

To 264 g. of 98% formic acid is added carefully with cooling 315 g. of concentrated NH$_4$OH and the resulting mixture is heated in an oil bath (190–200°) until an internal temperature of 160° is reached. 65 g. of 10,11-dihydro-5H-dibenzo [a,d] cyclohepten-5-one is then added all at once and the resulting mixture is heated at 185–190° for 12 hours. The mixture is cooled and poured into 500 cc. water. The mixture is extracted with ether. After standing, crystalline material precipitates out of the ether. The precipitation is filtered off to yield about 27 g. of product, melting at about 198–200°. Recrystallization from alcohol yields pure product, constant melting at about 208–209°.

EXAMPLE 8

*10,11-Dihydro-5H-Dibenzo [a,d] Cyclohepten-5-Amine*

A suspension of 5 g. of 10,11-dihydro-5H-dibenzo [a,d] cyclohepten-5-formamide, 50 cc. of 10% sodium hydroxide and 15 cc. of alcohol is refluxed for 24 hours. An oily layer is present at the end of 24 hours. The alcohol is distilled off; the mixture cooled and extracted with ether. The ether is dried over K$_2$CO$_3$ and removed. The residue crystallizes on trituration with hexane to yield about 3 g. of product melting at about 90–91°. Recrystallization from hexane gives a pure product, constant melting at about 91–92°.

EXAMPLE 9

*2-Chloro-10,11-Dihydro-5H-Dibenzo [a,d] Cyclohepten-5-Amine*

Following the procedures of Examples 7 and 8, but substituting an equivalent amount of 2-chloro-10,11-dihydro-5H-dibenzo [a,d] cyclohepten-5-one for the 10,11-dihydro-5H-dibenzo [a,d] cyclohepten-5-one in Example 7, 2-chloro-10,11-dihydro-5H-dibenzo [a,d] cyclohepten-5-amine is obtained.

Similarly, by substituting the following substituted 10,11-dihydro-5H-dibenzo [a,d] cyclohepten-5-ones for the 10,11-dihydro-5H-dibenzo [a,d] cyclohepten-5-one in Example 7 and following the procedures of Examples 7 and 8, the indicated substituted 10,11-dihydro-5H-dibenzo [a,d] cyclohepten-5-amine are formed.

| Substituted 10,11-Dihydro-5H-dibenzo [a,d] Cyclohepten-5-one | Product |
|---|---|
| 3-Ethoxy | 3-Ethoxy. |
| 3-Trifluoromethyl | 3-Trifluoromethyl. |
| 7-Fluoro-1-methyl | 7-Fluoro-1-methyl. |
| 4-Methyl | 4-Methyl. |
| 2-Methoxy | 2-Methoxy. |
| 4-Bromo | 4-Bromo. |
| 3-Tertiary butyl | 3-Tertiary butyl. |
| 1-Methoxy | 1-Methoxy. |
| 3-Fluoro | 3-Fluoro. |
| 2-Ethyl | 2-Ethyl. |

EXAMPLE 10

*2-Chloro-N-(10,11-Dihydro-5H-Dibenzo [a,d] Cyclohepten-5-yl)Acetamide*

To a solution of 21 g. of 10,11-dihydro-5H-dibenzo [a,d] cyclohepten-5-amine and 10.1 g. of N-methylmorpholine in 600 cc. of benzene is added 11.3 g. of chloracetyl chloride dropwise at room temperature. After complete addition, a white crystalline solid precipitates. The reaction is stirred at room temperature for 1 hour and then refluxed 1 hour. The solid is filtered and washed thoroughly with water to yield about 30 g. of product melting at about 215–217°. Recrystallization from aqueous acetone gives a pure product, melting constantly at about 227–229°.

When β-chloropropionyl chloride is substituted for the chloracetyl chloride in Example 10, 3-chloro-N-(10,11-dihydro-5H-dibenzo [a,d] cyclohepten-5-yl)-propionamide is obtained. Similarly, upon substitution of any of the substituted 10,11-dihydro-5H-dibenzo [a,d] cyclohepten-5-amines listed hereinbefore are substituted for 10,11-dihydro-5H-dibenzo [a,d] cyclohepten-5-amine in Example 10 the correspondingly substituted 2-chloro-N-(10,11-dihydro-5H-dibenzo [a,d] cyclohepten-5-yl)acetamide is formed.

EXAMPLE 11

*N-(10,11-Dihydro-5H-Dibenzo[a,d]Cyclohepten-5-yl)-2-Dimethylaminoacetamide*

A mixture of 14.3 g. of 2-chloro-N-(10,11-dihydro-5H-dibenzo [a,d] cyclohepten-5-yl)acetamide, 25 cc. of 3.7 N alcoholic dimethylamine and 25 cc. of absolute alcohol is heated in a bomb tube at 120° for 22 hours. The contents of the tube crystallizes on cooling. About 150 cc. of dry ether is added and the solid filtered and washed thoroughly with water to yield about 11 g. of product melting at about 148–150°. Recrystallization from aqueous alcohol gives a pure product, constant melting at about 153–154°.

EXAMPLE 12

*N-(10,11-Dihydro-5H-Dibenzo [a,d] Cyclohepten-5-yl)-2-Diethylaminoacetamide*

Following the procedure of Example 11 but substituting an equivalent amount of diethylamine for the dimethylamine, N-(10,11-dihydro-5H-dibenzo [a,d] cyclohepten-5-yl)-2-diethylaminoacetamide is obtained.

EXAMPLE 13

*N-(10,11-Dihydro-5H-Dibenzo [a,d] Cyclohepten-5-yl)-2-(4-Methylpiperazino)-Acetamide*

Following the procedure of Example 11 but substituting an equivalent amount of N-methylpiperazine for the dimethylamine, N-(10,11-dihydro-5H-dibenzo [a,d] cyclohepten-5-yl)-2-(4-methylpiperazino)acetamide is obtained.

Similarly, by substituting an equivalent amount of N-(2-hydroxyethyl)-piperazine and N-(2-hydroxyethoxyethyl)-piperazine for the dimethylamine in Example 16, N-(10,11-dihydroxy-5H-dibenzo [a,d] cyclohepten-5-yl)-2-[4-(2-hydroxyethyl)piperazino]acetamide and N-(10,11-dihydro-5H-dibenzo [a,d] cyclohepten-5-yl)-2-[4-(2-hydroxyethoxyethyl)piperazino]acetamide are obtained, respectively. Moreover, if one of the substituted 2-chloro-N-(10,11-dihydro-5H-dibenzo [a,d] cyclohepten-5-yl)-acetamides, whose preparation is disclosed hereinbefore, is substituted for the 2-chloro-N-(10,11-dihydro-5H-dibenzo [a,d] cyclohepten-5-yl)acetamide in Example 11, the correspondingly substituted N-(10,11-dihydro-5H-dibenzo [a,d] cyclohepten-5-yl)-2-dimethylaminoacetamide derivatives are obtained.

EXAMPLE 14

*N-(2-Dimethylaminoethyl)-10,11-Dihydro-5H-Dibenzo [a,d] Cyclohepten-5-Amine, Dihydrochloride*

A. PREPARATION OF N-(2-DIMETHYLAMINOETHYL)-10,11-DIHYDRO-5H-DIBENZO [a,d] CYCLOHEPTEN-5-AMINE

A solution of 9.3 g. of AlCl₃ in 200 cc. of ether is prepared with cooling and the solution added dropwise over 15 minutes to a slurry of 2.7 g. of LiAlH₄ in 200 cc. of ether. The resulting mixture is stirred for 10 minutes and then 9 g. of N-(10,11-dihydro-5H-dibenzo [a,d] cyclohepten-5-yl)-2-dimethylacetamide is added over a period of 20 minutes. The reaction is stirred at room temperature for 1½ hours; then refluxed for four hours and allowed to stand overnight. Then 5 cc. of water is added with cooling, followed by 50 cc. of 40% NaOH. A gummy mass settles to the bottom of the flask. The supernatant ether is dried over magnesium sulfate and the ether distilled off to yield a residue of the product.

B. PREPARATION OF N-(2-DIMETHYLAMINOETHYL)-10,11-DIHYDRO-5H-DIBENZO [a,d] CYCLOHEPTEN-5-AMINE, DIHYDROCHLORIDE

Four grams of N-(2-dimethylaminoethyl)-10,11dihydro-5H-dibenzo [a,d] cyclohepten-5-amine is dissolved in 75 cc. of ether and ethereal HCl added until the solution is acid to Congo. The solid which precipitates is filtered off and dissolved in 50 cc. of absolute alcohol and then 50 cc. of dry ether is added. The crystalline precipitate which forms is filtered to yield about 2.5 g. of product, melting at about 178–80° (dec.). Recrystallization from alcohol-ether does not change the melting point.

EXAMPLE 15

*N-(2-Diethylaminoethyl)-10,11-Dihydro-5H-Dibenzo [a,d] Cyclohepten-5-Amine, Dioxalate*

Following the procedure of Example 14, but substituting an equivalent amount of N-(10,11-dihydro-5H-dibenzo [a.d] cyclohepten-5-yl)-2-diethylacetamide for the N-(10,11-dihydro-5H-dibenzo [a,d] cyclohepten-5-yl) - 2 - dimethylacetamide in step A and an equivalent amount of oxalic acid for the hydrochloric acid in step B, N-(2-diethylaminoethyl)-10,11-dihydro-5H-dibenzo [a,d] cyclohepten-5-amine, dioxalate, is obtained.

EXAMPLE 16

*N-[2-(4-Methylpiperazino)Ethyl]-10,11 - Dihydro - 5H - Dibenzo [a,d] Cyclohepten-5-Amine, Dihydrochloride*

Following the procedure of Example 15, but substituting an equivalent amount of N-(10,11-dihydro-5H-dibenzo

[a.d] cyclohepten-5-yl)-2-(4-methylpiperazino)acetamide for the acetamide reactant in step A, N-[2-(4-methylpiperazino)ethyl]-10,11-dihydro-5H-dibenzo [a,d] cyclohepten-5-amine, dihydrochloride, is obtained.

Similarly, by substituting an equivalent amount of N-(10,11-dihydro-5H-dibenzo [a,d] cyclohepten-5-yl)-2-[4-(2-hydroxyethyl)piperazino]acetamide and N-(10,11-dihydro-5H-dibenzo [a,d] cyclohepten-5-yl)-2-[4-(2 - hydroxyethoxyethyl)piperazino]acetamide for the N-(10,11-dihydro-5H-dibenzo [a,d] cyclohepten-5-yl)-2-dimethylacetamide in Example 9, step A, and carrying out the procedure of the Example, N-(2-[4-(2-hydroxyethyl)piperazino]ethyl)-10,11-dihydro-5H-dibenzo [a,d] cyclohepten-5-amine, dihydrochloride, and N-(2-[4-(2-hydroxyethoxyethyl)piperazino]ethyl)-10,11-dihydro - 5H- dibenzo [a,d] cyclohepten-5-amine, dihydrochloride, are obtained respectively.

Moreover, when 3-chloro-N-(10,11-dihydro-5H-dibenzo [a,d] cyclohepten-5-yl)-propionamide is substituted for the 2-chloro-N-(10,11-dihydro-5H-dibenzo [a,d] cyclohepten-5-yl) acetamide in Example 11 and the procedures of Examples 11 and 14 are followed, N-(3-dimethylaminopropyl)-10,11-dihydro-5H-dibenzo [a,d] cyclohepten - 5-amine, dihydrochloride, is obtained.

Similarly, upon substitution of any of the substituted N-(10,11-dihydro-5H-dibenzo [a,d] cyclohepten-5-yl)-2-dimethylacetamides, whose preparation is described hereinbefore, for the N-(10,11-dihydro-5H-dibenzo [a,d] cyclohepten-5-yl)-2-dimethylacetamide in Example 14, the correspondingly substituted 10,11-dihydro-N-(2-dimethylaminoethyl)-5H-dibenzo [a,d] cyclohepten-5-amide hydrochlorides are formed.

This invention may be variously otherwise embodied within the scope of the appended claims.

What is claimed is:

1. A compound selected from the group consisting of bases of the formula wherein A is a lower alkylene radical of at least two carbon atoms, B is a basic saturated nitrogen-containing radical of less than twelve carbon atoms selected from the group consisting of amino, (lower alkyl)amino, di(lower alkyl)amino, (hydroxy-lower alkyl)amino, di(hydroxy-lower alkyl)amino, piperidyl, (lower alkyl)piperidyl, di(lower alkyl)piperidyl, (lower alkoxy)piperidyl, pyrrolidyl, (lower alkyl)pyrrolidyl, di(lower akyl)pyrrolidyl, (lower alkoxy)pyrrolidyl, morpholinyl, (lower alkyl)morpholinyl, di(lower alkyl)morpholinyl, (lower alkoxy)morpholinyl, thiamorpholinyl, (lower alkyl)thiamorpholinyl, di(lower alkyl)thiamorpholinyl, (lower alkoxy)thiamorpholinyl, piperazyl, (lower alkyl)piperazyl, di(lower alkyl)piperazyl, (lower alkoxy)piperazyl, (hydroxy-lower alkyl)piperazyl, (lower alkanoyloxyalkyl)piperazyl, (hydroxy-lower alkoxy-lower alkyl)piperazyl, and (carbo-lower alkoxy)piperazyl, and R and R' are each selected from the group consisting of hydrogen, halogen, lower alkyl, lower alkoxy and trifluoromethyl: and non-toxic acid-addition salts thereof.

2. N-[di(lower alkyl)amino(lower alkyl)]-10,11-dihydro-5H-dibenzo [a,d] cyclohepten-5-amine.

3. N-(2-dimethylaminoethyl)-10,11-dihydro - 5H - dibenzo [a,d] cyclohepten-5-amine.

4. A non-toxic acid-addition salt of the compound of claim 3.

5. A compound of the formula wherein R and R' are each selected from the group consisting of hydrogen, halogen, lower alkyl, lower alkoxy and trifluoromethyl.

6. 10,11-dihydro-5H-dibenzo [a,d] cycloheptene - 5-formamide.

7. A compound of the formula wherein R and R' are each selected from the group consisting of hydrogen, halogen, lower alkyl, lower alkoxy and trifluoromethyl.

8. 10,11 - dihydro - 5H - dibenzo [a,d] cyclohepten-5-amine.

9. A compound of the formula wherein A' is lower alkylene and R and R' are each selected from the group consisting of hydrogen, halogen, lower alkyl, lower alkoxy and trifluoromethyl.

10. 2 - chloro-N-(10,11-dihydro-5H-dibenzo [a,d] cyclohepten-5-yl)(lower alkanoylamide).

11. 2 - chloro-N-(10,11-dihydro-5H-dibenzo [a,d] cyclohepten-5-yl)acetamide.

12. A compound of the formula wherein A' is lower alkylene, B is a basic saturated nitrogen-containing radical of less than twelve carbon atoms selected from the group consisting of amino, (lower alkyl)amino, di(lower alkyl)amino, (hydroxy-lower alkyl)amino, di(hydroxy-lower alkyl)amino, piperidyl, (lower alkyl)piperidyl, di(lower alkyl)piperidyl, (lower alkoxy)piperidyl, pyrrolidyl, (lower alkyl)pyrrolidyl, di(lower alkyl)pyrrolidyl, (lower alkoxy)pyrrolidyl, morpholinyl, (lower alkyl)morpholinyl, di(lower alkyl)morpholinyl, (lower alkoxy)morpholinyl, thiamorpholinyl, (lower alkyl)thiamorpholinyl, di(lower alkyl)thiamorpholinyl, (lower alkoxy)thiamorpholinyl, piperazyl, (lower alkyl)piperazyl, di(lower alkyl)piperazyl, (lower alkoxy)piperazyl, (hydroxy-lower alkyl)piperazyl, (lower alkanoyloxyalkyl)piperazyl, (hydroxy-lower alkoxy-lower alkyl)piperazyl, and (carbo-lower alkoxy)piperazyl, and R and R' are each selected from the group consisting of hydrogen, halogen, lower alkyl, lower alkoxy and trifluoromethyl.

13. N-(10,11-dihydro-5H-dibenzo [a,d] cyclohepten-5-yl)di(lower alkyl)amino(lower alkanoylamide).

No references cited.